United States Patent [19]

Lee et al.

[11] 4,258,104

[45] Mar. 24, 1981

[54] AQUEOUS POLYMERIC DISPERSIONS, PAPER COATING COMPOSITIONS AND COATED PAPER ARTICLES MADE THEREWITH

[75] Inventors: Do I. Lee; Lawrence D. Harry; Jack D. Morris, all of Midland, Mich.

[73] Assignee: The Dow Chemical Company, Midland, Mich.

[21] Appl. No.: 34,061

[22] Filed: Apr. 27, 1979

[51] Int. Cl.$^3$ ................. B32B 23/08; B32B 27/10; B05D 3/02

[52] U.S. Cl. .................... 428/342; 260/29.6 RW; 260/29.6 TA; 260/29.7 W; 427/391; 428/511; 428/514; 525/221

[58] Field of Search ............. 260/29.6 RW, 29.6 T, 260/29.6 TA, 874, 887, 892, 896, 901, 29.7 W; 427/391; 428/342, 511, 513, 514; 525/221

[56] References Cited

U.S. PATENT DOCUMENTS

| | | | |
|---|---|---|---|
| 2,944,044 | 7/1960 | Baer | 260/29.7 X |
| 3,035,004 | 5/1962 | Glaurs | 260/29.7 |
| 3,081,198 | 3/1963 | Miller | 427/391 |
| 3,095,320 | 6/1963 | Leitner | 260/29.7 X |
| 3,122,446 | 2/1964 | Gold et al. | 427/342 |
| 3,365,410 | 1/1968 | Wesslau et al. | 260/29.6 |
| 3,404,116 | 10/1968 | Pueschner et al. | 260/29.7 |
| 3,484,420 | 12/1969 | Chihara | 260/29.6 X |
| 3,503,916 | 3/1970 | Warren et al. | 260/29.6 |
| 3,513,121 | 5/1970 | Heaton | 260/29.7 |
| 3,577,517 | 5/1971 | Kubot et al. | 424/47 |
| 3,637,566 | 7/1972 | Deck et al. | 260/29.6 TA |
| 3,652,497 | 3/1972 | Junas et al. | 260/470 A |
| 3,657,175 | 4/1972 | Zimmerman | 260/29.6 T |
| 3,660,339 | 5/1972 | Schol | 260/29.7 D |
| 3,694,394 | 9/1972 | Freeman | 260/29.7 W |
| 3,708,445 | 1/1973 | Junas et al. | 260/29.6 RW |
| 3,755,237 | 8/1973 | Isaacs | 260/29.6 TA |
| 3,759,858 | 9/1973 | Carey | 260/29.6 TA |
| 3,801,523 | 4/1974 | Shiratsuchi et al. | 260/29.6 RW |
| 3,810,977 | 5/1974 | Levine et al. | 424/47 |
| 4,129,711 | 12/1978 | Viont et al. | 526/286 |
| 4,134,872 | 1/1979 | Lee | 260/29.7 X |

FOREIGN PATENT DOCUMENTS 741282 8/1966 Canada.
813959 5/1969 Canada.
860677 2/1961 United Kingdom.

OTHER PUBLICATIONS

Fordyce, et al., *Alkali Soluble Acrylic Emulsions*, Feb., 1959, pp. 284–302.

Virbragge, C. J., *Mechanism of Alkali Thickening of Acid-Containing Emulsion Polymers*, Journal of Applied Polymer Science, pp. 897–928.

A18:General Add Polymers.

*Primary Examiner*—Michael R. Lusignan
*Attorney, Agent, or Firm*—James B. Guffey

[57] ABSTRACT

Lightweight coated paper articles having a desirable combination of properties are obtained through the use of coating compositions employing as the binder component thereof certain novel polymeric dispersions which comprise a major proportion on a dry basis of an alkali insoluble polymer and a minor proportion (e.g., from about 0.5 to about 25 weight percent on a dry basis based upon the alkali insoluble polymer) of certain alkali soluble polymers. Exemplary of the alkali insoluble polymers employed herein are both the carboxylated and noncarboxylated versions of known addition polymerized synthetic polymers having a glass transition temperature of about 50° C. or less. Exemplary of the alkali soluble polymers employed herein are synthetic addition polymers comprising (in polymerized form and in weight percent based on such polymer) from about 40 to about 90 percent of a vinyl ester of a carboxylic acid (e.g., vinyl acetate, vinyl propionate, etc.); from about 5 to about 55 percent of the nitrile or a $C_1$-$C_8$ alkyl ester of a monoethylenically unsaturated carboxylic acid; and from about 5 to about 15 percent of a monoethylenically unsaturated carboxylic acid.

27 Claims, No Drawings

AQUEOUS POLYMERIC DISPERSIONS, PAPER COATING COMPOSITIONS AND COATED PAPER ARTICLES MADE THEREWITH

BACKGROUND OF THE INVENTION

In one aspect, this invention relates to aqueous polymeric dispersions and to their use as the binder component of aqueous pigmented coating compositions. In another aspect, this invention relates to aqueous paper coating compositions and to coated paper articles made therewith.

In the paper industry, various types of paper sheets or substrates are coated with pigmented paper coating compositions in order to modify various characteristics thereof (e.g., surface smoothness and gloss, printability, ink receptivity, stiffness, opacity, etc.). In such coating operations, an aqueous coating composition containing an adhesive component (commonly called a binder) and a pigment is applied to one or both surfaces of the paper substrate by various techniques such as by the use of a blade coater, an air knife, roll coater, rod coater and the like.

Many different types of binder components have been suggested in the prior art for use in the aforementioned paper coating compositions. Such binder components have included natural materials such as starch, casein, soy bean protein, etc.; synthetic polymeric materials such as emulsions or latexes of carboxylated styrene/butadiene copolymers, latexes of copolymers of esters of acrylic and/or methacrylic acid, aqueous solutions of certain water- or alkali-soluble synthetic polymers, etc.; and combinations thereof. However, such prior art binder components typically suffer from one or more deficiencies in properties relating to the handling and ease of application of the binder components and/or the coating compositions themselves such as mechanical and/or storage stability, coating composition rheology (e.g., unacceptably high viscosity, etc.), unsatisfactory water retention and the like and/or in properties relating to the desirable characteristics of the coated paper made therewith such as coating hold-out, fiber coverage, coating smoothness and gloss, stiffness, printability, ink receptivity, pigment binding strength, glueability and the like. Moreover, such deficiencies are particularly pronounced in the case of the increasingly lightweight coated papers (which naturally require decreased coating weights) such as those employed largely in Europe for rotogravure printing applications.

In view of the foregoing, it is highly desirable to provide improved binder components (and improved coating compositions employing such binder) which alleviate the aforementioned deficiencies of the prior art compositions. Additionally, it is especially desirable to provide binder components and improved coating compositions which impart the desired coating properties to the ultimate coated paper product even at the relatively low coating weights applicable to (or characteristic of) coated paper for the European rotogravure printing industry (e.g., coating weights of as little as about 9 grams per square meter on a dry basis per side coated in the coated paper sheet).

SUMMARY OF THE INVENTION

In accordance with the present invention such an improved binder component is provided which is an aqueous polymeric dispersion containing from about 10 to about 60 weight percent based upon the total dispersion weight of an alkali-insoluble polymer having a glass transition temperature equal to or less than about 50° C. and from about 0.5 to about 25 weight percent based upon such alkali-insoluble polymer of an alkali-soluble synthetic addition polymer comprising, in polymerized form and based upon the weight of such alkali-soluble polymer, (a) from about 40 to about 90 percent of a vinyl ester of a non-addition polymerizable carboxylic acid; (b) from about 5 to about 55 percent of the nitrile, a hydroxyalkyl ester or an alkyl ester of a monoethylenically unsaturated carboxylic acid; and (c) from about 5 to about 15 percent of a monoethylenically unsaturated carboxylic acid.

Also provided by the practice of this invention are improved aqueous coating compositions which comprise a pigment and the aforementioned aqueous polymeric dispersion as a binder therefor as well as improved coated paper articles comprising a paper substrate (or sheet) carrying a dried deposit of such coating compositions on at least one surface thereof.

The aqueous polymeric dispersions of the invention—which are referred to interchangeably herein as latexes—have adequate mechanical and storage stability and are readily prepared from relatively inexpensive available monomeric materials.

The paper coating compositions of the invention generally provide adequate water retention for acceptable high-speed blade runability in paper coating operations and such coating compositions are well suited for application to paper substrates by the various conventional paper coating processes. Moreover, such compositions also permit obtention of the desired combination of coating composition and ultimate coating properties without necessarily requiring the use of auxiliary ingredients such as casein, protein, etc., which are typically employed for various purposes in conventional coating compositions.

In addition, the coated papers resulting from the use of such coating compositions exhibit a desirable combination of properties even at relatively low coating weights. That is, coated paper employing such compositions exhibit excellent coating hold-out, smoothness and fiber coverage as well as good coating porosity, ink receptivity, printability, glueability and pigment binding strength even at coating weights as low as about 9 gm/m$^2$ on a dry basis per side coated. Accordingly, such compositions are exceptionally well suited for lightweight coated paper of the type employed by the European rotogravure printing industry.

DETAILED DESCRIPTION OF THE INVENTION

The aqueous polymeric dispersions or latexes of the present invention contain a major proportion on a dry (i.e., a polymer solids) weight basis of dispersed colloidal particles of an alkali-insoluble polymer which is substantially insoluble both in neutral or acidic aqueous medium as well as in alkaline aqueous medium (i.e., an aqueous solution having a pH of greater than 7.0). In addition, such alkali insoluble polymer is of the type that the dispersed polymer particles thereof—upon drying—coalesce to form a continuous, adherent film at ambient temperature and pressure or at least at the temperature and pressure selected to dry or finish articles coated with compositions employing the aqueous polymer dispersions of the invention. Such polymers thus include those known alkali insoluble polymers which have a glass transition of about 50° C. or less (preferably about 25° C. or less) and which are conventionally employed in the form of aqueous polymeric dispersions or latexes as the film-forming binder or adhesive component in various known coating compositions. Typical of such polymers are the alkali insoluble synthetic addition polymers derived from monomers such as the monovinylidene aromatic monomers; the aliphatic conjugated dienes; the vinyl esters of carboxylic acids (e.g., vinyl esters of carboxylic acids of from 2 to about 8 carbon atoms); esters of monoethylenically unsaturated carboxylic acids (e.g., methacrylic acid, acrylic acid, crotonic acid, etc.) with various alcohols (e.g., with alkanols of from 1 to about 8 carbon atoms); nitriles of monoethylenically unsaturated carboxylic acids (e.g., acrylonitrile, methacrylonitrile, etc.); hydroxyalkyl esters (e.g., $C_2$ to about $C_4$ hydroxyalkyl esters) of monoethylenically unsaturated carboxylic acids; the monoethylenically unsaturated carboxylic acids themselves and the like.

Of particular interest as the film-forming alkali insoluble polymers in the practice of this invention are the carboxylated and noncarboxylated versions of addition copolymers derived from monovinylidene aromatic monomers and aliphatic conjugated dienes and the noncarboxylated versions thereof which further comprise a polymerized hydroxyalkyl ester of a monoethylenically unsaturated carboxylic acid are particularly preferred. Thus, for example, polymers which are particularly useful in this regard include alkali insoluble synthetic addition polymers comprising in polymerized form and based upon the weight of such alkali insoluble polymer (a) from about 30 to about 75 percent (preferably from about 30 to 60 percent) monovinylidene aromatic monomer; (b) from about 25 to about 70 percent (preferably from about 40 to about 60 percent) of an aliphatic conjugated diene monomer; (c) from 0 to about 10 percent (preferably from about 1 to about 10 percent and most preferably from about 1 to about 5 percent) of a monoethylenically unsaturated carboxylic acid and (d) from 0 to about 20 percent (preferably from about 1 to about 20 percent) of the nitrile, a $C_1$ to about $C_8$ alkyl ester or a $C_2$ to about $C_4$ hydroxyalkyl ester of a monoethylenically unsaturated carboxylic acid (especially from about 1 to 10, most preferably from about 1 to about 5, percent of a $C_2$ to about $C_4$ hydroxyalkyl ester of a monoethylenically unsaturated carboxylic acid).

Monovinylidene aromatic monomers useful in the aforementioned alkali insoluble polymers include those monomers wherein a radical of the formula

(wherein R is hydrogen or a lower alkyl such as an alkyl having from 1 to 4 carbon atoms) is attached directly to an aromatic nucleus containing from 6 to 10 carbon atoms, including those wherein the aromatic nucleus is substituted with alkyl or halogen substituents. Typical of these monomers are styrene, α-methylstyrene, ortho-, meta- and para-methylstyrene, ortho-, meta- and para-ethylstyrene, o,p-dimethylstyrene, o,p-diethylstyrene, isopropylstyrene, o-methyl-p-isopropylstyrene, p-chlorostyrene, p-bromostyrene, o,p-dichlorostyrene, o,p-dibromostyrene, vinylnaphthalene, diverse vinyl (alkylnaphthalenes) and vinyl (halonaphthalenes) and comonomeric mixtures thereof. Because of considerations such as cost, availability, ease of use, etc., styrene and vinyltoluene are preferred and styrene is especially preferred as the monovinylidene aromatic monomer.

Aliphatic conjugated diene monomers useful in the aforementioned alkali insoluble polymers include those conventionally employed in that type of polymer. Typically, such aliphatic conjugated dienes contain from 4 to about 9 carbon atoms and such monomers thus include 1,3-butadiene, 2-methyl-1,3-butadiene, 2,3-dimethyl-1,3-butadiene, pentadiene, 2-neopentyl-1,3-butadiene and other hydrocarbon analogs of 1,3-butadiene and, in addition, the substituted 1,3-butadienes such as 2-chloro-1,3-butadiene, 2-cyano-1,3-butadiene, the substituted straight chain conjugated pentadienes, the straight chain and branched chain conjugated hexadienes, other straight chain and branched chain conjugated dienes having from 4 to about 9 carbon atoms and comonomeric mixtures thereof. The 1,3-butadiene hydrocarbon monomers such as those mentioned hereinbefore provide polymers having particularly desirable properties and are therefore preferred. The cost, ready availability and the excellent properties of interpolymers produced therefrom makes 1,3-butadiene the most preferred aliphatic conjugated diene.

As indicated hereinbefore, other monomers which are also suitable for use in the aforementioned alkali insoluble polymers include the nitriles, the alkyl esters (typically the $C_1$ to about $C_8$ alkyl esters) and the hydroxyalkyl esters (typically the $C_2$ to about $C_4$ hydroxyalkyl esters) of monoethylenically unsaturated carboxylic acids as well as the monoethylenically unsaturated carboxylic acids themselves. The particular monoethylenically unsaturated carboxylic acid chosen in this regard is not particularly critical so long as the acid (or its chosen nitrile or ester derivative) is copolymerizable with the other monomers of the alkali insoluble polymer. Examples of suitable such acid monomers include itaconic acid, acrylic acid, methacrylic acid, fumaric acid, maleic acid, vinyl benzoic acid and isopropenyl benzoic acid. Preferred monoethylenically unsaturated carboxylic acids include acrylic acid, methacrylic acid, itaconic acid, fumaric acid and maleic acid. Comonomeric mixtures of such monoethylenically unsaturated acids can be employed if desired. When the acids themselves are desired to be employed, such acids can be introduced to the polymerization as such or they can be formed in situ in an aqueous polymerization medium by introducing a hydrolyzable derivative of such acid (e.g., salts or the anhydride of the desired acid) into such aqueous medium.

Examples for the aforementioned monomers which are derivatives of the above-described monoethylenically unsaturated carboxylic acids include the nitriles thereof such as acrylonitrile and methacrylonitrile; the $C_2$ to about $C_4$ hydroxyalkyl esters thereof such as 2-hydroxyethyl acrylate, 3-hydroxypropyl acrylate, etc; the $C_1$ to about $C_8$ alkyl esters thereof such as methyl acrylate, methyl methacrylate, ethyl acrylate, ethyl methacrylate, 2-chloroethyl methacrylate, propyl acrylate or methacrylate, n-butyl methacrylate, 2-ethylhexyl acrylate, etc. and the like.

The aforementioned alkali insoluble polymers are employed in the aqueous polymeric dispersions of the invention in a major proportion relative to the amount of the alkali soluble polymer both being taken on a dry (i.e., a polymer solids) weight basis. As to the amount of such film-forming alkali insoluble polymer relative to the total weight (i.e., the wet weight) of such dispersion, the proportion thereof is not particularly critical. However, as a general rule, such alkali insoluble polymer constitutes from about 10 to about 60 (preferably from about 20 to about 60 and most preferably from about 40 to about 60) weight percent of the total aqueous dispersion weight.

As noted hereinbefore, the aforementioned alkali insoluble polymers employed in the practice of the invention are of the type already known in the art and, accordingly, such polymers can be conveniently prepared pursuant to the emulsion polymerization procedures conventionally employed for the preparation of such polymers. Naturally, following such emulsion polymerization, the solids content of the resulting dispersion or latex can be adjusted as desired by adding water thereto or by distilling water therefrom. Similarly, any of the conventionally employed additives (such as, for example, surfactants, bacteriocides, neutralizers, antifoamers, etc.) can also be added to such latexes in the normal manner either after completion of such polymerization process or at any other convenient conventional point in the preparation of such alkali insoluble polymers.

The second essential polymeric ingredient of the aqueous polymeric dispersions or latexes of the invention is a synthetic addition polymer which is readily soluble in aqueous alkaline medium (i.e., which is alkali soluble). As used herein, the term "alkali soluble" is employed (a) to mean that the polymer thereby referred to is solubilized (at a 3 weight percent concentration and at about 25° C.) in alkaline aqueous medium to the extent that the resulting alkaline aqueous mixture is transparent (i.e., clear) or at least ranging from translucent to opaque and (b) to distinguish that type of polymer from one which—under the same circumstances—is merely dispersible in the aqueous alkaline medium and which is therefore characterized by a white, milky appearance of the resulting aqueous alkaline dispersion.

Preferably, the aforementioned alkali soluble polymer is insoluble in acidic aqueous medium but becomes solubilized in aqueous medium having a pH of 7 or above and such alkali soluble polymer comprises in polymerized form (a) a vinyl ester of a non-addition polymerizable carboxylic acid, (b) a nitrile, a hydroxyalkyl ester or an alkyl ester of a monoethylenically unsaturated carboxylic acid and (c) a monoethylenically unsaturated carboxylic acid.

Suitable vinyl esters for use in the aforementioned alkali soluble polymers are those which do not impart substantial cross-linking to the resulting polymer (and which therefore do not prevent or interfere with the obtention of the desired alkali solubility of such polymer). Accordingly, the vinyl ester monomers typically employed are those vinyl esters in which the acid component thereof is not readily addition polymerizable. Examples of such vinyl esters include those of aromatic and saturated aliphatic (i.e., alkanoic) carboxylic acids, particularly vinyl esters of such acids having from 2 to about 8 carbon atoms, and such vinyl esters thus include vinyl acetate, vinyl propionate, vinyl butyrate, vinyl-2-ethylhexoate, vinyl benzoate and the like. Naturally, the less expensive and more readily available vinyl esters such as vinyl acetate, vinyl propionate, etc. (particularly vinyl acetate) are especially desirable for use in such alkali soluble polymers and are therefore preferred.

The amount of the above-described vinyl ester monomer employed in the aforementioned alkali soluble polymer can vary somewhat in the practice of the present invention. However, it is important that the amount thereof employed be at least about 40 but not more than about 90 weight percent of such alkali soluble polymer inasmuch as at lower levels thereof the coating holdout and fiber coverage of the ultimate paper coating composition will generally be detrimentally affected and inasmuch as at higher levels thereof the preparation of such polymers generally becomes somewhat difficult or troublesome. Preferably, the aforementioned vinyl ester monomer constitutes from about 45 to about 90 (more preferably from about 50 to about 85) weight percent of the alkali soluble polymer in the practice of the invention and most preferably from about 60 to about 85 weight percent of such vinyl ester is employed based upon the total weight of such alkali soluble polymer.

Suitable nitrile and ester monomers for use in the aforementioned alkali soluble polymeric component of the present invention include nitriles, $C_2$ to about $C_4$ hydroxyalkyl esters and $C_1$ to about $C_8$ alkyl esters of the addition polymerizable monoethylenically unsaturated carboxylic acids described hereinbefore and typical examples of such monomers include those hereinbefore described in conjunction with the alkali insoluble polymeric component of the present invention.

The amount of the aforementioned nitrile or ester monomers employed in the alkali soluble polymers of the invention is not particularly critical so long as the amount and nature of the particular monomer employed (a) does not prevent the resulting polymer from being readily dissolved in aqueous alkaline medium and (b) does not cause the resulting polymer to be substantially soluble in acidic aqueous medium. However, as a general rule, from about 5 to about 55 (preferably from about 5 to about 40) weight percent of monomers selected from this general class of monomer is employed in such alkali soluble polymers and, typically, the amount, if any, of the more hydrophilic versions of such monomers (e.g., the $C_2$ to about $C_4$ hydroxyalkyl ester species) employed in such polymers is generally limited to the range of from 0 to about 20 (preferably from 0 to about 10) to avoid the aforementioned, undesirable solubility in acidic aqueous medium.

The third class of monomer employed in the aforementioned alkali soluble polymers of the invention is a monoethylenically unsaturated carboxylic acid which is addition copolymerizable with the above-described vinyl ester monomer and the above-described nitrile or ester monomer and, naturally, comonomeric mixture of such unsaturated carboxylic acids can also be suitably employed. Preferably, such carboxylic acid monomer is a monobasic, monomethylenically unsaturated carboxylic acid containing from 3 to about 10 carbon atoms such as, for example, acrylic acid, methacrylic acid, crotonic acid, haloacrylic acids (e.g., 2-chloroacrylic acid, 2-bromoacrylic acid, 3-chloroacrylic acid, 2,3-dichloroacrylic acid, 3,3-dichloroacrylic acid, etc.), 2-phenylacrylic acid, 3-phenylacrylic acid, vinyl benzoic acid, isopropenyl benzoic acid and the like. However, monoethylenically unsaturated dibasic carboxylic acids such as, for example, fumaric acid, itaconic acid, maleic acid, etc., can also be beneficially employed, particularly if used in combination with (i.e., as a comonomer with) the aforementioned monobasic carboxylic acid monomers. Naturally, the monoethylenically unsaturated carboxylic monomers of particular interest in the practice of this invention are those which are relatively inexpensive and readily available. Accordingly, the preferred species of such monomers are those having from 3 to about 5 carbon atoms and most preferably acrylic or methacrylic acid is employed.

The amount of the foregoing monoethylenically unsaturated carboxylic acid monomers employed in the alkali soluble polymer component of the present invention is not particularly critical so long as the amount thereof is sufficient to impart the requisite alkali solubility to the resulting alkali soluble polymer without, at the same time, detrimentally affecting the desired properties (e.g., coating holdout, coating smoothness and fiber coverage) of the ultimate paper coating compositions of the invention or of the ultimate coated paper articles made therewith. However, as a general rule, from about 5 to about 15 (preferably from about 5 to about 13 and especially from about 7 to about 13) weight percent of such monoethylenically unsaturated carboxylic acid monomers are employed in the alkali soluble polymers employed in the present invention.

In addition to the foregoing monomers, the alkali soluble polymers of the invention can also optionally contain a relatively small amount (e.g., from 0 up to about 20 weight percent based upon the alkali soluble polymer) of one or more other monomers which are addition polymerizable with such foregoing monomers. Examples of suitable such optional monomers include amides of the aforementioned ethylenically unsaturated carboxylic acids (e.g., acrylamide, methacrylamide and the like) as well as the monovinylidene aromatic monomers and the aliphatic conjugated dienes which have been described hereinbefore in conjunction with the alkali insoluble polymeric component of the present invention. The amount of such optional types of monomers employed in the alkali soluble polymers of the invention is not particularly critical so long as the above-noted required monomers are employed within the specified ranges thereof. Preferably, however, the amount of any hydrophilic types of such optional monomers (e.g., the amides of unsaturated carboxylic acids) which is employed is limited such that the resulting alkali soluble polymer is not rendered substantially soluble in acidic or neutral aqueous medium. Similarly, the amount of any hydrophobic versions of such optional monomers which is employed (e.g., the monovinylidene aromatic monomers, the aliphatic conjugated dienes, etc.) are limited such that the requisite ready alkali solubility of the resulting alkali soluble polymer is not substantially impaired. Thus, while total amounts of the aforementioned optional types of monomers in the range of 0 up to about 20 weight percent of the alkali soluble polymer can typically be employed therein, it is generally preferable to limit the use of such optional type of monomers to an amount ranging from about 0 to about 10 weight percent based upon the weight of the alkali soluble polymer.

The molecular weight of the aforementioned alkali soluble polymers is not particularly critical in the practice of the invention. However, it has been found that the alkali soluble polymers of very low molecular weight (i.e., those exhibiting a Brookfield viscosity at about 25° C. of less than about 10 cps at 20 rpm in an alkaline aqueous solution at a pH of 9 and at a concentration of about 3 weight percent polymer solids based on the total solution weight) are generally somewhat less desirable than the alkali soluble polymers having relatively higher molecular weight, particularly when such low molecular weight polymers contain about 10 percent or more of the above-described carboxylic acid monomer. Accordingly, the aforementioned alkali soluble polymers having a molecular weight such that a 3 weight percent solids aqueous solution thereof at pH 9 has a Brookfield viscosity at about 25° C. of at least about 10 cps or more (especially of from about 10 to about 1200) at 20 rpm are preferred for use in the pigmented paper coating compositions (i.e., coating colors) of the invention. Thus, while the above-noted lower molecular weight versions can often be employed in such coating colors with some benefit, such low molecular weight versions are generally more beneficially used as water retention agents, thickeners, dispersants and stabilizers for various types of aqueous colloidal dispersions.

As noted hereinbefore, the above-described alkali soluble polymer component is employed in the aqueous polymeric dispersions of the present invention in a minor proportion relative to the amount of the alkali insoluble polymer component thereof, both polymeric components being taken on a dry weight basis (i.e., a polymer solids weight basis). The precise ratio of such polymeric components relative to each other in the dispersions of the invention is not particularly critical so long as the alkali soluble polymer is employed in an amount sufficient to provide the desired combination of properties such as coating holdout, fiber coverage, coating smoothness and water retention for the paper coating compositions and/or the ultimate paper coatings prepared therefrom. However, as a general rule, the alkali soluble polymeric component is employed in such aqueous polymeric dispersion in an amount ranging from about 0.5 to about 25 (preferably from about 1 to about 20) weight percent based upon the weight of the alkali insoluble polymer on a dry weight (i.e., a polymer solids) basis. Within the above-noted range, the exact proportion of the alkali soluble polymer employed will depend upon the particular combination of properties desired for the paper coating composition (and for the ultimate coated paper) to be prepared from the instant polymer dispersions. For example, from the standpoint of water retention and high speed blade runability, it is generally advantageous to employ the above-described alkali soluble polymer component at a level sufficient to provide from about 0.3 to about 1.5 parts by weight of the alkali soluble polymer solids per 100 parts by weight of pigment solids in the ultimate paper coating compositions to be prepared from the aqueous polymer dispersions of the invention. Accordingly, when the desired paper coating compositions are of the type having a relatively low binder to pigment ratio (e.g., such as about 3 to about 10 parts binder to 100 parts pigment on a dry weight basis), it is generally advantageous—in terms of water retention and blade runability—that the alkali soluble polymer be employed at a polymer solids level of from about 10 to about 25 weight percent based upon the polymer solids of the alkali insoluble polymer in the aqueous polymer dispersion of the invention. Similarly, when the ultimate paper coating composition is of the type employing a relatively high binder to pigment ratio (e.g., on the order of about 10 or 15 to about 30 parts binder solids per 100 parts of pigment solids), then the use of somewhat lower levels of the alkali soluble polymer component (e.g., from about 1 to about 15 and especially from about 1 to about 5 weight percent based upon the polymer solids of the alkali insoluble polymer) component is generally desirable for obtention of the desired water retention and high speed blade runability. On the other hand, in the event that coating holdout, fiber coverage and coating smoothness (e.g., as evidenced by Heliotest printability) are the properties of primary interest (and/or if auxiliary water retention aids are employed for water retention and runability purposes), then—regardless of the binder to pigment ratio—it is generally advantageous that the aforementioned alkali soluble polymer constitutes from about 0.5 to about 15 (preferably from about 1 to about 10 and most preferably from about 1 to about 6) weight percent of the polymer solids in the abovedescribed aqueous polymer dispersion of the instant invention.

As was the case with the above-described alkali insoluble polymers, the alkali soluble polymers of the invention are prepared by emulsion polymerization of the indicated monomeric components pursuant to conventional emulsion polymerization techniques in acidic aqueous medium. Thus, for example, each of such polymer components can be conveniently prepared by dispersing their respective monomer charges in an acidic aqueous medium with agitation and with the aid of from about 0.5 to about 5 weight percent based upon such monomer charge of conventional anionic and/or non-ionic emulsifiers (e.g., potassium n-dodecyl sulfonate, sodium isooctylbenzene sulfonate, sodium laurate, nonylphenol ethers of polyethylene glycols and the like) and thereafter polymerizing such dispersion.

Conventional polymerization catalysts can be employed in the foregoing polymerization and common examples thereof include peroxides, persulfates, azo compounds and the like such as sodium persulfate, potassium persulfate, ammonium persulfate, hydrogen peroxide t-butyl hydroperoxide, cumene hydroperoxide, azodiisobutyric diamide as well as catalysts (e.g., redox catalysts) which are activated in the water phase (e.g., with a water-soluble reducing agent). Typically, such catalysts are employed in an amount ranging from 0.01 to about 5 weight percent based upon the monomer weight and in general polymerization temperatures in the range of about 50° to about 110° C. (preferably from about 70° to about 90° C.) are employed in such polymerization.

Similarly, conventional chain transfer agents can be employed in the aforementioned polymerizations to regulate the molecular weight of the polymers formed therein. Examples of suitable such chain transfer agents include n-dodecyl mercaptan, bromoform, carbon tetrachloride and the like, and such chain transfer agents are generally advantageously employed in amounts ranging from about 0.01 to about 5 (especially from about 0.1 to about 1) weight percent based upon the weight of the monomers employed. Indeed, it is preferable in the practice of this invention that such transfer agents (particularly bromoform in amounts of from 0.1 to about 1, especially 0.1 to about 0.5, weight percent) be employed in the preparation of the alkali soluble polymeric components of the present invention.

As is the case for the aforementioned alkali insoluble polymeric components of the invention, the solids content of the alkali soluble latex can be adjusted following the above-described polymerization to the level desired by adding water thereto or by distilling water therefrom. Generally, the desired level of polymeric solids content of the alkali soluble latex is from about 15 to about 50 (preferably from 25 to about 40) weight percent on a total weight basis and such solids content is typically obtainable directly from the polymerization process without the need for any adjustment therein by the optional methods just described.

Similarly, as with the alkali insoluble latexes, it is sometimes desirable to have small amounts of certain known additives incorporated in the alkali soluble latex components of the present invention. Typical examples of such optional additives again include surfactants, bacteriocides (e.g., formaldehyde), neutralizers, antifoamers, etc., and, such additives can be incorporated into such alkali soluble latexes in the regular fashion and at any convenient point in the preparation of such latexes.

The manner of combination of the abovedescribed alkali soluble and alkali insoluble latex components to form the aqueous polymeric dispersions of the invention is not particularly critical and can therefore be accomplished in any convenient fashion. Thus, for example, the two components can be blended together in latex form to provide an acidic aqueous polymeric dispersion of the invention wherein both polymeric components thereof are in the form of discrete polymeric particles dispersed in an acidic aqueous medium. Alternatively, the acidic latex of alkali soluble polymer can first be converted to an aqueous alkaline solution of such polymer and can thereafter be admixed with the alkali insoluble latex to form an alkaline aqueous polymeric dispersion of the invention wherein only the alkali insoluble polymer is present in the form of discrete, dispersed polymer particles and wherein the alkali soluble polymer component is dissolved in the continuous alkaline aqueous dispersing medium of such dispersion. Similarly, this latter type of alkaline aqueous polymeric dispersion of the invention can also be conveniently prepared by first preparing an acidic blend of the alkali soluble and alkali insoluble latexes and thereafter adding base thereto to adjust the pH thereof into the alkaline range and to thereby solubilize the alkali soluble polymer in the continuous aqueous medium of such dispersion.

As noted, any of the above-indicated methods can be employed to mix or blend together the alkali soluble and the alkali insoluble polymeric components and to thereby form either the above-described acidic type of aqueous polymeric dispersion or the above-described alkaline type of aqueous polymeric dispersion, both of which are within the scope of the present invention. However, the alkaline aqueous dispersions of the invention typically have higher viscosity than their acidic counterparts by virtue of the solubilization of the alkali soluble polymer component in the continuous aqueous medium thereof. Naturally, such increased viscosity typically renders subsequent mixing operations more difficult and expensive by virtue of the incresed energy and time required to thoroughly mix other ingredients (e.g., pigments, fillers, etc.) with such relatively more viscous alkaline aqueous polymeric dispersion of the invention. Accordingly, the acidic versions of the aqueous polymeric dispersions of the invention are generally preferred, particularly where such dispersions are intended for ultimate use as binder components for pigmented or filled coating compositions (e.g., paper coating compositions and the like) which, as noted hereinbefore, constitutes one aspect of the instant invention.

The coating compositions of the present invention are conventional in the sense that they comprise a pigment and an adhesive component (commonly called a binder) and in the sense that they employ those two components in the usual ratios relative to each other. However, the novel coating compositions of the invention differ from their conventional counterparts by virtue of employing the hereinbefore described aqueous polymeric dispersions of the invention as a binder component thereof and such novel coating compositions are particularly useful as coating colors for use in paper coating applications.

The term "coating color" is often applied in the art to aqueous paper coating compositions comprising an adhesive (commonly called a "binder") and a pigment. In the "coating colors" of the present invention, the adhesive and the pigment are mixed in such proportions that, for each 100 parts by weight of dry pigment, from about 3 to about 30 (preferably from about 4 to about 25) parts by weight, dry basis, of adhesive are present in the mixture. The aqueous polymeric dispersions disclosed herein can be the sole adhesive (or binder) employed in the coating colors thereof or other adhesives known in the art (e.g., natural binders such as casein, protein, starch, etc.) can be used in conjunction with the polymer dispersion of the invention, if desired. Generally from about 20 to about 100 percent, preferably from about 50 to about 100 percent, most preferably from about 70 to about 100 percent, by weight of the adhesive in a coating color of this invention is the aqueous polymeric dispersion described herein, the percentages being on a dry solids basis.

The total solids content of the coating color of the invention does not differ substantially from that in prior art coating colors and depends largely upon the equipment being used. Usually, such solids content ranges from about 30 percent to about 70 percent (preferably from about 40 to about 65 percent) by weight based upon the total coating color weight with about 40 to about 55 weight percent typically being employed in air knife coating operations and with 55 to about 65 weight percent solids being typically employed in blade coating applications.

Pigments which can be employed in the improved paper coating compositions of the invention include known mineral pigments, known plastic pigments and mixtures thereof. Any mineral pigments suitable for use in conventional mineral pigmented paper coating compositions can be employed in the coating composition of the invention. Examples of suitable mineral pigments for use in the coating compositions of the invention thus include finely divided clays (especially of the kaolin type), calcium carbonate, titanium dioxide, satin white, etc. Other materials such as talc, blanc fixe, ochre, carbon black, aluminum powder or platelets and other pigmentary or filler material can be employed in minor amounts in conjunction with the aforementioned mineral pigments.

Plastic pigments suitable for use in the aqueous paper coating composition of the invention include those known to be useful in plastic pigmented paper coatings, such as those described in U.S. Pat. No. 3,949,138. Such plastic pigments are generally characterized as plastic, polymeric particles which (a) have a number average particle diameter of from about 0.3 to about 0.8 micrometer and (b) are not film forming at temperatures and pressures selected to dry or finish the coated paper. By "nonfilm-forming" it is meant that the plastic particles do not coalesce to form a film at ambient temperature or at temperatures and pressures selected to dry or finish the coated article. Other plastic pigments suitable for use in the aqueous paper coating composition of the invention include those described in U.S. Pat. Nos. 3,293,144 and 3,988,522.

The coating colors of the invention can optionally contain other additives such as thickeners, water retention agents (e.g., alginic acid or carboxymethylcellulose) and curing agents (e.g., melamine formaldehyde resins, urea formaldehyde resins and glyoxal) to achieve specific coating properties. When thickeners and/or curing agents are employed, they generally constitute, individually, from about 1 to about 5 percent of the total binder weight on a dry weight basis.

The aforementioned components can be combined to form the coating colors of the invention in any convenient manner. As a general rule, however, it is convenient and preferred to first disperse the pigment (or pigment mixture) and other powdery components in water and to thereafter admix such pigment dispersion with the other coating color ingredients. Additionally, it is also preferred to admix all of the binder ingredients together before combining them with the pigment or the aqueous dispersion of such pigment. Thus, in the preparation of the coating colors of the invention, it is preferred (a) to start with the hereinbefore described acidic aqueous polymeric dispersion of the invention (i.e., containing the above-indicated alkali insoluble and alkali soluble polymeric components); (b) to admix that polymeric dispersion with any other desired binder components; (c) to thereafter admix the aqueous binder component of step (b) with an aqueous dispersion of the desired pigment components and (d) finally, to adjust the pH of the coating color resulting from step (c) into the alkaline range (preferably to a pH value of from about 7 to about 13, especially to a value of from about 7.5 to about 10) before application of such coating color substrate to be coated therewith.

Naturally, other methods of combining the above-described coating color ingredients can also be employed if desired. Thus, for example, a coating color containing all of the ingredients except the alkali soluble polymer component of the invention can first be prepared and such alkali soluble polymer component can thereafter be added thereto. In this latter method, the alkali soluble polymer is preferably admixed with the previously admixed remainder of the coating color ingredients in the form of an acidic aqueous dispersion of such alkali soluble polymer and the pH of the resulting coating color is then adjusted into the alkaline pH range to solubilize that polymer in the aqueous medium of the coating color before application of such coating color to the desired substrate. Naturally, in an alternative embodiment of this latter coating color preparation method, the alkali soluble polymeric component can first be solubilized in its aqueous medium and thereafter be admixed in the form of an alkaline aqueous polymeric solution with the premixed remainder of the coating color ingredients.

In a similar fashion, the above-described alkaline version of the aqueous polymeric dispersion of the invention (i.e., containing the alkali insoluble polymer dispersed in an aqueous alkaline medium in which the alkali soluble polymer is dissolved) can first be prepared and can thereafter be admixed in any desired fashion with the remainder of the coating color ingredients (i.e., the chosen pigment component or an aqueous dispersion thereof; optional other binder ingredients such as starch, etc.; other additives such as thickeners, curing agents, etc.; and the like).

The coating color of the invention is conveniently applied to the paper in conventional amounts (e.g., typically from about 3 to about 30, preferably from about 7 to about 15 grams per square meter of coated surface on a dry solids basis) and by conventional means such as letter-press print roll coater, offset roll coater, size press, air knife, blade coater and the like. However, as has been noted hereinbefore, the coating colors of the invention are of particular benefit in the preparation of lightweight coated papers for rotogravure printing applications. Accordingly, the preferred means of applying such coatings to the paper substrate are blade and air knife coating methods. The amount of the coating so applied is preferably about 15 grams or less per square meter of coated surface area (i.e., 30 grams or less total coating weight per square meter of paper sheet when such paper sheet is coated on both sides thereof) on a dry weight basis.

After application, the coating is dried by any convenient method. Generally, however, drying is accomplished by causing a current of air at a velocity of up to about 10,000 feet per minute to impinge upon the surface of the coated material. The temperature of the air may vary up to about 320° C. but the duration of contact is such that the coating is not heated to above about 100° C. and preferably not above the glass transition temperature characteristic of any plastic pigment which may be optionally employed in the coating colors of the invention.

After drying, the coated paper product can be finished pursuant to processes conventionally employed in the art such as gloss calendering, super calendering and the like. The resulting coatings exhibit good adhesion to paper and to solid additives. The resulting coated papers can be printed in a conventional manner and are particularly well suited for rotorgravure printing techniques.

The present invention is further illustrated, though not intended to be limited by, the following examples in which all parts and percentages are on a weight basis unless otherwise specified.

Examples 1–4

Aqueous Polymeric Dispersions and Coating Colors of the Invention and Coated Papers Made Therewith A series of four alkali soluble polymer latexes (i.e., Latexes A-D) are prepared by emulsion polymerizing vinyl acetate, ethyl acrylate and methacrylic acid in the proportions indicated in Table I below.

In each instance, the individual monomer charge (along with the amount of bromoform indicated in Table I) is continuously added with stirring and at a constant rate over a four-hour period to about 190 parts by weight (per 100 parts by weight of such monomer charge) of an initial aqueous medium containing about 0.1 weight percent of sodium dodecyldiphenyl ether disulfonate and about 0.07 weight percent of the pentasodium salt of diethylenetriaminepentaacetic acid. In addition, an aqueous stream containing (in parts by weight based upon 100 parts by weight of the monomer) 56 parts deionized water, 1.8 parts sodium dodecyldiphenyl ether disulfonate, 0.4 part sodium persulfate and 0.4 part sodium bicarbonate is also added at a constant rate over the same four-hour period.

The polymerization is conducted at 80° C. during the course of the above-noted four-hour period and at the end of that period polymerization (i.e., a "cookdown") is continued for an additional hour in order to achieve at least a 90 percent or greater conversion of monomer to polymer.

Following the above-described polymerization, the solids content of the resulting latexes are determined, the viscosity of a 3 weight percent polymer solids solution at pH 9 is determined as a relative measure of polymer molecular weight for each of the resulting latexes; the amount of a 10 weight percent sodium hydroxide solution in water required to adjust a latex sample containing 9 grams of polymer solids to a pH value of 9 is determined for each of the resulting polymers and the relative clarity immediately upon such pH adjustment is visually determined as a relative measure of how readily soluble the resulting polymer is under aqueous alkaline conditions. The results of the foregoing tests are also summarized in Table I below. Also presented in such table are the corresponding results for a comparative control alkali soluble latex (i.e., C-1). Such comparative latex (i.e., Control 1) is prepared in the same fashion as Examples 1–4 except that, as is indicated in Table I below, the methacrylic acid content is relatively higher (and the vinyl acetate level is relatively lower) than the contents of the corresponding monomers of the alkali soluble latexes of the invention.

TABLE I

ALKALI SOLUBLE LATEX COMPOSITIONS OF EXAMPLES 1–4

| MONOMERS | ALKALI SOLUBLE POLYMER | | | | |
|---|---|---|---|---|---|
| | A | B | C | D | C-1* |
| Vinyl Acetate | 63.3 | 42.5 | 63.3 | 63.3 | 25 |
| Ethyl Acrylate | 31.7 | 42.5 | 26.7 | 21.7 | 50 |
| Methacylic Acid | 5.0 | 15.0 | 10.0 | 15.0 | 25 |
| Bromoform | 0.25 | 0.25 | 0.25 | 0.25 | 0.25 |
| % Solids | 28.3 | 20.3[2] | 29.2 | 28.9 | 31.1 |
| pH of latex | 4.0 | 4.5 | 3.7 | 3.5 | 4.0 |
| 3% Soln. Visc. pH 9 | 8.5 cps | 130 cps | 165 cps | 1100 cps | 70 cps |
| g 10% NaOH[1] | 2.3 | 6.5 | 4.4 | 6.8 | 10.5 |
| Clarity | v. opaque | tr. haze | sl. haze | tr. haze | v. opaque |

*Not an example of the invention
[1]Amount of 10% NaOH required to adjust latex sample containing 9 g polymer solids to a pH of 9.
[2]Due to a pump malfunction, only ~80% of the monomer was used.

The above-described alkali soluble latexes are each admixed in various proportions with a carboxylated styrene/butadiene copolymer latex (i.e., 47/50/3 weight ratio styrene/butadiene/itaconic acid copolymer latex) to form the corresponding latex blend of alkali soluble and alkali insoluble polymers. Such latex blends are then admixed with a pigment (i.e., Dinkie "A" clay) in an amount of 5.5 parts by weight of combined alkali soluble and alkali insoluble polymer solids per 100 parts by weight of clay to form the corresponding 40 weight percent total solids paper coating compositions (i.e., "coating colors"). Thereafter, the pH values of such coating colors are adjusted to a value of 9 with an aqueous solution of 10 weight percent sodium hydroxide and are applied to a black paper substrate for evaluation of their black paper hiding ability. The results of the black paper hiding tests are summarized in Tables II and III below. In interpreting such results, it should be noted that the Black Paper Hiding Test provides a measure of coating holdout (e.g., how effectively the coating composition covers the fibrous surface of the substrate which is coated) and that such test is performed by applying the coating color to be evaluated to a surface of a black paper substrate using a Meyer Rod and then determining the brightness value for the resulting coated black paper using a Gardner Multipurpose Reflectometer. Naturally, relatively higher brightness readings reflect relatively better effectiveness in coating or covering (i.e., hiding) of the surface of the black paper substrate.

TABLE II

BLACK PAPER HIDING TEST

| Blend Ratio[1] | Example 1 (Latex A) | | Example 2 (Latex B) | | Control #1* (Latex C-1) | |
|---|---|---|---|---|---|---|
| | Coating Weight[2] | Brightness | Coating Weight[2] | Brightness | Coating Weight[2] | Brightness |
| 30:1 | 10.1 | 54.8 | 9.2 | 53.8 | 9.9 | 52.0 |
| 20:1 | 10.7 | 56.2 | 9.5 | 55.3 | 8.8 | 52.1 |
| 15:1 | 11.3 | 56.8 | 8.7 | 55.0 | 8.7 | 52.1 |
| 11:1 | 9.7 | 55.3 | 9.1 | 55.8 | 9.2 | 53.2 |
| 5:1 | 9.7 | 54.8 | 9.0 | 54.8 | 9.0 | 54.2 |

*Not an example of the invention.
[1]Weight ratio of alkali insoluble latex to alkali soluble latex on a dry polymer solids basis
[2]Pounds per ream. [To convert to g/m$^2$, multiply the lbs/ream value by 1½.] This is the coating weight result using a #8 Meyer Rod with a 40 weight percent total solids coating color.

TABLE III

BLACK PAPER HIDING TEST

| Blend Ratio[1] | Example 3 (Latex C) | | Example 4 (Latex D) | | Control #2* (Latex C-1) | |
|---|---|---|---|---|---|---|
| | Coating Weight[2] | Brightness | Coating Weight[2] | Brightness | Coating Weight[2] | Brightness |
| 30:1 | 6.8[3] | 51.1 | 7.0[3] | 51.0 | 6.6[3] | 47.4 |
| | 8.8[4] | 55.6 | 8.7[4] | 54.6 | 7.1[4] | 50.5 |
| 20:1 | 6.9[3] | 50.7 | 6.9[3] | 50.0 | 5.9[3] | 45.7 |
| | 7.9[4] | 55.2 | 8.0[4] | 54.0 | 7.9[4] | 50.6 |
| 15:1 | 7.1[3] | 53.1 | 7.2[3] | 50.7 | 6.4[3] | 45.5 |
| | 7.8[4] | 55.7 | 7.8[4] | 52.0 | 7.8[4] | 50.8 |
| 11.1 | 6.8[3] | 50.0 | 7.3[3] | 51.7 | 7.0[3] | 46.6 |
| | 8.4[4] | 54.0 | 7.5[4] | 53.0 | 7.6[4] | 51.1 |
| 5:1 | 7.5[3] | 50.6 | 6.7[3] | 50.4 | 6.8[3] | 49.2 |
| | 8.7[4] | 55.4 | 7.5[4] | 54.0 | 7.5[4] | 53.0 |

*Not an example of the invention.
[1]Weight ratio of alkali insoluble latex to alkali soluble latex on a dry weight basis.
[2]Pounds per ream. The value in g/m$^2$ is obtained by multiplying lbs/ream value by 1½.
[3]Coating weight obtained with #4 Meyer Rod.
[4]Coating weight obtained with #6 Meyer Rod.

From the Black Paper Hiding Test results of Tables II and III it is readily apparent that the coating colors employing the alkali soluble latexes of the invention provide notably higher brightness readings than do the corresponding coating color controls employing the comparative latex C-1, thereby reflecting better coating hold-out (i.e., improved coating efficiency) for the coating colors of the invention relative to the comparative coating color.

EXAMPLES 5–8

The alkali soluble latexes (i.e., Latexes A–D and Comparative Latex C-1) of Examples 1–4 are blended with the alkali insoluble latex of those examples in the fashion described in Examples 1–4 and in the proportions indicated in Table IV below. Each of the resulting latex blends are then admixed with a 70% solids aqueous dispersion of Dinkie "A" clay (in a ratio of 5.5 parts combined alkali insoluble and alkali soluble polymer solids per 100 parts clay solids) to form 60 percent total solids paper coating compositions (i.e., coating colors). Thereafter, the pH of each of such coating colors is adjusted with an aqueous solution of 10% NaOH to a value of about 9 and the resulting alkaline coating colors are then applied via a bench blade coater to the wire side surface of a 39 grams per square meter paper substrate (i.e., European Gravure grade base stock). The coated paper thereby obtained is then finished by calendering through four nips at 140° F. and 400 pli (pounds per linear inch) and the 75° gloss, brightness and Heliotest printability of the resulting finished coated papers were determined in the usual fashion. The results of such testing is summarized in Table IV below.

TABLE IV

COATING COLOR AND COATED PAPER PROPERTIES

| PARAMETERS | EXAMPLE NUMBER | | | | Control* #3 |
|---|---|---|---|---|---|
| | 5 | 6 | 7 | 8 | |
| Latex Blend | | | | | |
| Alkali insoluble latex (AIL)[1] | AIL #1 | AIL #1 | AIL #1 | AIL #1 | AIL #1 |
| Alkali soluble latex (ASL)[2] | A | B | C | D | C-1 |
| Blend ratio of AIL/ASL (solids wt basis)[3] | 15:1 | 11:1 | 15:1 | 20:1 | 11:1 |
| Polymer Solids in blend (wt %) | 47.7 | 45.8 | 47.8 | 48.3 | 47.6 |
| Coating Colors | | | | | |
| Brookfield Viscosity @ 20 rpm (cps) | 2200 | 4100 | 4300 | 4000 | 6000 |
| Brookfield Viscosity @ 100 rpm (cps) | 780 | 1200 | 1250 | 1140 | 1740 |
| High shear viscosity (cps) | 29 | 37 | 34 | 34 | 49 |
| Coated Paper Properties | | | | | |
| Coating weight (lbs/ream)[4] | 7.0 | 7.1 | 7.2 | 7.2 | 7.2 |

TABLE IV-continued

COATING COLOR AND COATED PAPER PROPERTIES

| PARAMETERS | EXAMPLE NUMBER | | | | |
|---|---|---|---|---|---|
| | 5 | 6 | 7 | 8 | Control* #3 |
| 75° gloss | 59 | 61 | 55 | 55 | 62 |
| Brightness | 74.8 | 75.3 | 74.8 | 74.9 | 75.2 |
| Heliotest printability at 40 kg (mm/20 missing dots) | 29 | 25 | 30 | 28 | 22 |

*Not an example of the invention.
[1]47/50/3 weight ratio styrene/butadiene/itaconic acid.
[2]See Table I of Examples 1–4 for the compositions of Latexes A–D.
[3]The AIL/ASL blend ratio chosen in each case represents what appears to be the optimum blend ratio for the particular ASL-AIL combination based upon the Black Paper Hiding Test results indicated in Tables II and III of Examples 1–4 above.
[4]Multiply by 1¼ to obtain value in g/m².

As is apparent from Table IV, the coated articles of Examples 5–8 exhibit better printability than does the comparative coated paper of Control 3 as evidenced by the higher Heliotest printability values for the former relative to the latter.

EXAMPLES 9–14

A series of six alkali soluble latexes (i.e., Latexes E–J) are prepared pursuant to the polymerization procedure of Examples 1–4. Each of such latexes is then blended (in a ratio of 17.5 parts by weight alkali insoluble latex to 1 part by weight alkali soluble latex on a dry polymer solids basis) with the alkali insoluble latex of Examples 1–4 and such latex blends are then employed to prepare 60 percent total solids coating colors with Dinkie "A" clay (5.5 parts total polymer solids by weight per 100 parts by weight clay) in accordance with the procedure of Examples 5–8. Thereafter, the coating colors thus obtained are employed to coat one surface of a 39 grams per square meter European Gravure grade paper base stock, the coated papers are finished by calendering and the properties of the finished coated papers are evaluated; all pursuant to the procedures of Examples 5–8. Additionally, comparative latex blends, coating colors and coated papers (i.e., Control 4) employing the alkali soluble latex control of Examples 1–4 (i.e., Latex C-1) are prepared for comparative purposes in the same fashion. However, in such comparative experiment, the weight ratio of the alkali insoluble polymer to the alkali soluble polymer (i.e., C-1) is 11:1 since that ratio appears to be about the optimum mixture for that particular alkali soluble latex as evidenced by the Black Paper Binding Test results for Control 1 in Examples 1–4.

The compositions of the alkali soluble latexes of the invention (i.e., Latexes E–J) are summarized in Table V below and results of the evaluation of the coatings obtained using the above-noted coating colors are summarized in Table VI below.

TABLE V

ALKALI SOLUBLE LATEX COMPOSITIONS EXAMPLES 9–14

| MONOMERS | ALKALI SOLUBLE POLYMER LATEX | | | | | |
|---|---|---|---|---|---|---|
| | E | F | G | H | I | J |
| Vinyl Acetate | 63.3 | 73.3 | 73.3 | 63.3 | 68.3 | 83.3 |
| Ethyl Acetate | 26.7 | 16.7 | 16.7 | 26.7 | 21.7 | 6.7 |
| Methacrylic Acid | 10.0 | 10.0 | 10.0 | 10.0 | 10.0 | 10.0 |
| Bromoform | 0.5 | 0.25 | 0.5 | 0.25 | 0.375 | 0.375 |
| Weight % Solids | 27.4 | 28.3 | 29.1 | 28.8 | 28.9 | 28.8 |
| pH | 3.2 | 4.0 | 4.4 | 4.1 | 3.9  4.1 | |
| 3% Soln. Visc. pH 9 | 12.5 cps | 195 cps | 9.0 cps | 240 cps | 80 cps | 85 cps |
| g 10% NaOH[1] | 4.4 | 4.6 | 4.4 | 4.6 | 4.6 | 4.7 |
| Clarity | tr. haze | lt-mod haze | tr. haze | lt. haze | tr. haze | mod. haze |

[1]Amount of 10% NaOH required to adust latex sample containing 9 g of polymer solids to a pH of 9.

TABLE VI

COATING COLOR AND COATED PAPER PROPERTIES

| Example | Alkali Soluble Latex | Coating Color Viscosity (Brookfield, cps) | | Coating Weight (lb/ream)[1] | 75° Gloss | Brightness | Heliotest[2] |
|---|---|---|---|---|---|---|---|
| | | 20 rpm | 100 rpm | | | | |
| 9 | E | 4200 | 1120 | 7.5 | 59 | 74.5 | 71 |
| 10 | F. | 6600 | 2000 | 7.5 | 51 | 74.2 | 72 |
| 11 | G | 650 | 260 | 7.3 | 65 | 74.2 | 55 |
| 12 | H | 6200 | 1800 | 7.6 | 51 | 74.2 | 74 |
| 13 | I | 5500 | 1560 | 7.5 | 52 | 74.5 | 74 |
| 14 | J | 3300 | 1100 | 7.3 | 51 | 74.5 | 72 |
| Control #4* | C-1 | 5000 | 1460 | 7.1 | 65 | 75.0 | 56 |

*Not an example of the invention.
[1]The coating weight in g/m² is determined by multiplying the lb/ream value by 1¼.
[2]40 kg values in terms of mm/20 missing dots.

From the above-presented results, it is apparent that—with the exception of Example 11—the paper coating compositions of the foregoing examples provide substantially better printability than does the comparative coating color of Control 4. As to the somewhat lower results of Example 11, it must be noted (a) that the molecular weight of the alkali polymer employed therein is very low (i.e., 9 cps at 3 percent solids) relative to that of the alkali soluble polymer (i.e., C-1) of Control 4 and (b) that comparison of that particular type of latex with the one of Control 4 on a more comparable molecular weight basis (i.e., comparing Example 10 with Control 4) readily demonstrates the beneficial printability improvements provided by the practice of the instant invention.

EXAMPLES 15–31

A series of 17 alkali soluble polymer latexes (i.e., Latexes K–Z and AA) are prepared pursuant to the polymerization procedure of Examples 1–4. Each of such latexes is then blended with an alkali insoluble polymer latex (i.e., a 46.5/49.1/2.6/1.5/0.3 weight ratio copolymer of, respectively, styrene/butadiene/2-hydroxyethyl acrylate/fumaric acid/acrylic acid) in a proportion of 3 parts by weight of the alkali soluble polymer solids per 100 parts by weight of the alkali insoluble polymer solids. Thereafter, the resulting latex blends are employed to prepare 60 weight percent total solids coating colors with Dinkie "A" clay, said coating color employing 5.5 parts by weight of total polymer solids per 100 parts by weight of clay and being prepared in accordance with the procedures of Examples 5–8. The coating colors thus obtained are employed to coat one surface of a 39 gram per square meter European Gravure grade paper base stock and the resulting coated papers are finished and evaluated in accordance with the procedures of Examples 5–8. Additionally, latex blends, coating colors and coated papers (i.e., Controls 5 and 6) employing comparative alkali soluble latexes C-2 and C-3 are prepared and evaluated in the same fashion for the purpose of comparison.

The composition of the various alkali soluble latexes employed in these examples (i.e., Latexes K–Z and AA) as well as the composition of the comparative alkali soluble latexes are summarized in Table VII below. The results of the evaluation of the paper coatings obtained using the above-noted coating colors are summarized in Table VIII below.

EXAMPLES 32–48

Examples 15–31 are repeated except that the various alkali soluble polymer latexes (including comparative latexes C-2 and C-3) are employed in the blended aqueous polymer dispersion at a level of 10 weight percent on a polymer solids basis relative to the polymer solids of the alkali insoluble polymer component. In addition, a comparative composition (i.e., Control 9) containing no alkali soluble polymer component is also prepared and evaluated in the same fashion for comparative purposes.

The evaluation results for the paper coatings formed from the coating compositions employing the above-noted alkali insoluble/alkali soluble latex blends—and for the composition free of alkali soluble polymer—are summarized in Table IX below.

TABLE VII

COMPOSITION OF LATEXES K-Z AND AA AND OF COMPARATIVE LATEXES C2-C3

| Latex | Monomers[1,2] VA | MAA | EA | Bromoform[1] | 3% Solution Visc. @ pH = 9[3] |
|---|---|---|---|---|---|
| K | 53 | 7 | 40 | 0 | 20 |
| L | 53 | 7 | 40 | 0.3 | 15 |
| M | 53 | 13 | 34 | 0 | — |
| N | 53 | 13 | 34 | 0.3 | 53 |
| O | 58 | 10 | 32 | 0.15 | 490 |
| P | 63 | 7 | 30 | 0 | 29 |
| Q | 63 | 7 | 30 | 0.3 | 18.5 |
| R | 63 | 13 | 24 | 0 | — |
| S | 63 | 13 | 24 | 0.3 | >500 |
| T | 68 | 10 | 22 | 0.15 | >500 |
| U | 73 | 7 | 20 | 0 | 48 |
| V | 73 | 7 | 20 | 0.3 | 45 |
| W | 73 | 13 | 14 | 0 | — |
| X | 73 | 13 | 14 | 0.3 | >500 |
| Y | 90 | 5 | 5 | 0 | 33 |
| Z | 40 | 15 | 45 | 0.4 | 21 |
| AA[4] | 40 | 15 | 40 | 0.4 | 33 |
| C-2 | 25 | 25 | 50 | 0.25 | 70 |
| C-3 | 0 | 25 | 75 | 0 | >500 |

[1]Parts by weight
[2]VA = Vinyl acetate
MAA = Methacrylic acid
EA = Ethyl acrylate
[3]Brookfield viscosity at 20 rpm
[4]Latex AA additionally contains 5 parts by weight of acrylamide

TABLE VIII

COATING EVALUATIONS AT THE 3% LEVEL OF ALKALI SOLUBLE LATEX BASED ON THE ALKALI INSOLUBLE LATEX

| Example No. | Alkali Soluble Latex | Coating Weight[1] | 75° Gloss | Brightness | Heliotest Printability @ 35 kg[2] |
|---|---|---|---|---|---|
| 15 | K | 7.2 | 62 | 74.3 | 30 |
| 16 | L | 6.9 | 60 | 74.3 | 32 |
| 17 | M | 7.3 | 53 | 74 | 37 |
| 18 | N | 7.1 | 57 | 74 | 32 |
| 19 | O | 6.9 | 56 | 74.3 | 34 |
| 20 | P | 7.4 | 58 | 74.3 | 33 |
| 21 | Q | 7.4 | 64 | 72.2 | 34 |
| 22 | R | 7.3 | 53 | 74 | 42 |
| 23 | S | 7.4 | 53 | 74.3 | 39 |
| 24 | T | 7.3 | 60 | 74.3 | 34 |
| 25 | U | 7.3 | 57 | 74.2 | 33 |
| 26 | V | 7.1 | 58 | 74.3 | 34 |
| 27 | W | 7.2 | 56 | 74.4 | 36 |
| 38 | X | 6.9 | 56 | 74.3 | 31 |
| 29 | Y | 6.9 | 53 | 74 | 30 |
| 30 | Z | 7.1 | 68 | 74.4 | 22 |
| 31 | AA | 7.1 | 55 | 74 | 24 |
| C-5* | C-2 | 6.9 | 67 | 74.3 | 23 |
| C-6* | C-3 | 6.9 | 65 | 74.3 | 23 |

*Not an example of the invention.
[1]Pounds per ream.
[2]Millimeters to 20 missing dots.

TABLE IX

COATING EVALUATIONS AT THE 10% LEVEL OF ALKALI SOLUBLE LATEX BASED ON THE ALKALI INSOLUBLE LATEX

| Example No. | Alkali Soluble Latex | Coating Weight[1] | 75° Gloss | Brightness | Heliotest Printability 35 kg[2] |
|---|---|---|---|---|---|
| 32 | K | 6.8 | 59 | 74.4 | 31 |
| 33 | L | 7.2 | 60 | 74 | 34 |
| 34 | M | 7.0 | 58 | 74 | 30 |
| 35 | N | 6.8 | 63 | 74 | 28 |
| 36 | O | 7.0 | 57 | 74.4 | 29 |
| 37 | P | 7.0 | 59 | 74 | 33 |
| 38 | Q | 6.8 | 61 | 74 | 30 |
| 39 | R | 6.8 | 58 | 74 | 34 |
| 40 | S | 6.9 | 62 | 74.6 | 29 |
| 41 | T | 6.8 | 56 | 74.6 | 31 |

TABLE IX-continued
COATING EVALUATIONS AT THE 10% LEVEL OF ALKALI SOLUBLE LATEX BASED ON THE ALKALI INSOLUBLE LATEX

| Example No. | Alkali Soluble Latex | Coating Weight[1] | 75° Gloss | Brightness | Heliotest Printability 35 kg[2] |
|---|---|---|---|---|---|
| 42 | U | 7.0 | 57 | 74.4 | 40 |
| 43 | V | 7.0 | 58 | 74 | 36 |
| 44 | W | 7.0 | 52 | 74 | 41 |
| 45 | X | 7.0 | 56 | 74.6 | 36 |
| 46 | Y | 7.4 | 59 | 74.7 | 35 |
| 47 | Z | 6.9 | 66 | 74.6 | 25 |
| 48 | AA | 6.6 | 58 | 74.3 | 29 |
| C-7* | C-2 | 7.1 | 63 | 74.6 | 22 |
| C-8* | C-3 | 7.1 | 63 | 74.7 | 20 |
| C-9* | None | 7.0 | 63 | 73.3 | 20 |

*Not an example of the invention.
[1]Pounds per ream.
[2]Millimeters to 20 missing dots.

From the above-noted results, it can be seen that the coating compositions employing the aqueous polymer dispersions of the foregoing examples generally provide notably better Heliotest printability than do the comparative control compositions. Moreover, it is also apparent that the foregoing is particularly the case (a) when the alkali soluble polymer component is employed at a 10 percent level relative to the alkali insoluble latex on a polymer solids basis and/or (b) when the alkali soluble polymer component hereof contains more than 40 weight percent vinyl acetate. Thus, the beneficial and advantageous results provided by the practice of the instant invention similarly are equally apparent.

While the present invention has been described herein by reference to particular examples and specific embodiments thereof, such specific embodiments and examples are not to be understood as limiting the scope of the instantly claimed invention.

What is claimed is:

1. An aqueous polymer dispersion containing:
   (a) from about 10 to about 60 weight percent based upon the total dispersion weight of an alkali insoluble polymer having a glass transition temperature equal to or less than about 50° C. and
   (b) from about 0.5 to about 25 weight percent based upon the alkali insoluble polymer of an alkali soluble synthetic addition polymer comprising, in polymerized form and based upon the weight of such alkali soluble polymer,
      (1) from about 40 to about 90 percent of a vinyl ester of a non-addition polymerizable carboxylic acid;
      (2) from about 5 to about 55 percent of a nitrile, a $C_2$ to about $C_4$ hydroxyalkyl ester or a $C_1$ to about $C_8$ alkyl ester of a monoethylenically unsaturated carboxylic acid; and
      (3) from about 5 to about 15 percent of a monoethylenically unsaturated carboxylic acid.

2. The aqueous dispersion of claim 1 wherein the alkali insoluble polymer is a synthetic addition polymer comprising, in polymerized form and based upon the weight of such alkali insoluble polymer,
   (a) from about 30 to about 75 percent of a monovinylidene aromatic monomer and
   (b) from about 25 to about 70 percent of an aliphatic conjugated diene.

3. The aqueous dispersion of claim 2 wherein the alkali insoluble synthetic addition polymer further comprises, in polymerized form and based upon the weight of such alkali insoluble polymer, from about 1 to about 10 percent of a monoethylenically unsaturated carboxylic acid.

4. The aqueous dispersion of claim 3 wherein the alkali insoluble synthetic addition polymer further comprises, in polymerized form and based upon the weight of such alkali insoluble polymer, from about 1 to about 20 percent of a nitrile, a $C_1$ to about $C_8$ alkyl ester or a $C_2$ to about $C_4$ hydroxyalkyl ester of a monoethylenically unsaturated carboxylic acid.

5. The aqueous dispersion of claim 3 wherein the alkali insoluble polymer comprises from about 1 to about 5 weight percent based upon the weight of such alkali insoluble polymer of polymerized hydroxyalkyl acrylate containing from 2 to about 4 carbon atoms is the hydroxyalkyl thereof.

6. The aqueous dispersion of claim 2 wherein the alkali insoluble addition polymer is substantially free of polymerized ethylenically unsaturated carboxylic acids.

7. The aqueous dispersion of claim 6 wherein the alkali insoluble polymer comprises from about 1 to about 5 weight percent based upon the weight of such alkali insoluble polymer of polymerized hydroxyalkyl acrylate containing from 2 to about 4 carbon atoms in the hydroxyalkyl group thereof.

8. The aqueous dispersion of claim 1 wherein the vinyl ester component of the alkali soluble polymer constitutes from about 50 to about 85 weight percent of such alkali soluble polymer.

9. The aqueous dispersion of claim 1 wherein the vinyl ester component of the alkali soluble polymer constitutes from about 60 to about 85 weight percent of such alkali soluble polymer.

10. The aqueous dispersion of claim 8 wherein the monoethylenically unsaturated carboxylic acid component of the alkali soluble polymer constitutes from about 5 to about 13 weight percent of such alkali soluble polymer.

11. The aqueous dispersion of claim 8 wherein the monoethylenically unsaturated carboxylic acid component of the alkali soluble polymer constitutes from about 7 to about 13 weight percent of such alkali soluble polymer.

12. An aqueous coating composition comprising a pigment and the aqueous polymeric dispersion of claim 1 as a binder.

13. The aqueous coating composition of claim 12 wherein the amount of the polymer solids of the aqueous polymeric dispersion is from about 3 to about 30 parts by weight per 100 parts by weight of the pigment, all parts being on a dry basis.

14. A coated paper product comprising a paper sheet carrying a dried deposit of the coating composition of claim 13.

15. The coated paper product of claim 14 wherein the amount of the dried coating composition on each coated surface of the paper sheet is less than about 25 weight percent of dry weight of the uncoated paper sheet.

16. The coated paper product of claim 14 wherein the amount of the dried coating composition on each coated surface of the paper sheet is from about 3 to about 30 grams per square meter on a dry basis and based upon the surface area of such coated surface.

17. The aqueous polymer dispersion of claim 1 wherein the vinyl ester component of the alkali soluble polymer constitutes from about 45 to about 90 weight percent of such alkali soluble polymer.

18. The aqueous polymer dispersion of claim 1 wherein the monoethylenically unsaturated carboxylic acid component of the alkali soluble polymer constitutes from about 5 to about 13 weight percent of such alkali soluble polymer.

19. The aqueous polymer dispersion of claim 1 wherein the monoethylenically unsaturated carboxylic acid component of the alkali soluble polymer constitutes from about 7 to about 13 weight percent of such alkali soluble polymer.

20. The aqueous polymer dispersion of claim 1 wherein the vinyl ester component of the alkali soluble polymer is vinyl acetate.

21. The aqueous polymer dispersion of claim 20 wherein the nitrile, hydroxyalkyl ester or $C_1$ to about $C_8$ alkyl ester component of the alkyl soluble polymer is a $C_1$ to about $C_8$ alkyl ester of acrylic or methacrylic acid.

22. The aqueous polymer dispersion of claim 21 wherein the monoethylenically unsaturated carboxylic acid component of the alkali soluble polymer is acrylic or methacrylic acid.

23. The aqueous polymer dispersion of claim 22 wherein the alkali insoluble polymer component thereof is a synthetic addition polymer comprising, in polymerized form and based upon the weight of such alkali insoluble polymer,
 (a) from about 30 to about 75 weight percent styrene and
 (b) from about 25 to about 70 weight percent of 1,3-butadiene.

24. The aqueous polymer dispersion of claim 23 wherein the alkali insoluble polymer thereof further comprises, in polymerized form and based upon the weight of such alkali insoluble polymer, from about 1 to about 5 weight percent of acrylic, methacrylic, itaconic, fumaric or maleic acid.

25. The aqueous polymer dispersion of claim 23 wherein the alkali insoluble polymer thereof further comprises, in polymerized form and based upon the weight of such alkali insoluble polymer, from about 1 to about 5 weight percent of a $C_2$ to about $C_4$ hydroxyalkyl ester of acrylic or methacrylic acid.

26. An aqueous polymer dispersion containing:
 (a) from about 20 to about 60 weight percent based upon the total dispersion weight of colloidally dispersed particles of an alkali insoluble polymer having a glass transition temperature equal to or less than about 50° C. and
 (b) from about 0.5 to about 25 weight percent based upon the alkali insoluble polymer of colloidally dispersed particles of an alkali soluble synthetic addition polymer comprising, in polymerized form and based upon the weight of such alkali soluble polymer,
  (1) from about 40 to about 90 percent of a vinyl ester of a non-addition polymerizable carboxylic acid;
  (2) from about 5 to about 55 percent of a nitrile, a $C_2$ to about $C_4$ hydroxyalkyl ester or a $C_1$ to about $C_8$ alkyl ester of a monoethylenically unsaturated carboxylic acid; and
  (3) from about 5 to about 15 percent of a monoethylenically unsaturated carboxylic acid.

27. The aqueous polymer dispersion of claim 26 wherein the alkali insoluble polymer constitutes from about 40 to about 60 weight percent of the total weight of such dispersion.

* * * * *

UNITED STATES PATENT AND TRADEMARK OFFICE
CERTIFICATE OF CORRECTION

PATENT NO. : 4,258,104

DATED : March 24, 1981

INVENTOR(S) : Do I. Lee; Lawrence D. Harry; Jack D. Morris

It is certified that error appears in the above—identified patent and that said Letters Patent is hereby corrected as shown below:

Column 5, line 34, delete "tranparent" and insert --transparent--.

Column 6, line 54, delete "monomethylenically" and insert --monoethylenically--.

Column 10, line 49, delete "virture" and insert --virtue--.

Column 11, line 18, delete "thereof" and insert --hereof--.

Column 13, line 36, delete "rotorgravure" and insert --rotogravure--.

Column 14, line 33 under Table I, first column, delete "Methacylic" and insert --Methacrylic--.

Column 18, Table V under the column heading "I", line 6, delete "3.9 4.1" and insert --3.9--; Under the column heading "J", line 6, insert --4.1--.

Column 20, Table VIII, line 45, in the first column delete "38" and insert --28--;

Column 20, line 60, Table IX, under the heading "Heliotest Printability", delete "35 $kg^2$" and insert --@ 35 $kg^2$--.

UNITED STATES PATENT AND TRADEMARK OFFICE
CERTIFICATE OF CORRECTION

PATENT NO. : 4,258,104

DATED : March 24, 1981

INVENTOR(S) : Do I. Lee; Lawrence D. Harry; Jack D. Morris

It is certified that error appears in the above-identified patent and that said Letters Patent is hereby corrected as shown below:

Column 21, Table IX-continued, under the heading "Heliotest Printability", delete "35 $kg^2$" and insert --@ 35 $kg^2$--.

Column 22, line 14, delete "is" and insert --in--; line 15 before "thereof" insert --group--.

Signed and Sealed this

Eighth Day of September 1981

[SEAL]

*Attest:*

*Attesting Officer*

GERALD J. MOSSINGHOFF

*Commissioner of Patents and Trademarks*